United States Patent
Grace et al.

(10) Patent No.: US 10,720,620 B1
(45) Date of Patent: Jul. 21, 2020

(54) HIGH VOLTAGE BATTERY PACK MOUNTING SYSTEMS FOR PROVIDING LOAD PATH MANAGEMENT DURING IMPACT LOADING EVENTS

(71) Applicant: FORD GLOBAL TECHNOLOGIES, LLC, Dearborn, MI (US)

(72) Inventors: Ihab Grace, Grosse Pointe Woods, MI (US); David Edward Paul, Brighton, MI (US); Ahteram Khan, Canton, MI (US); Brad Warren Probert, Farmington Hills, MI (US); Anil Reddy Pullalarevu, Northville, MI (US); Mike Popovski, Warren, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/247,624

(22) Filed: Jan. 15, 2019

(51) Int. Cl.
*B60K 1/04* (2019.01)
*H01M 2/10* (2006.01)
*B60L 53/80* (2019.01)
*B60S 5/06* (2019.01)

(52) U.S. Cl.
CPC ............ *H01M 2/1083* (2013.01); *B60K 1/04* (2013.01); *B60L 53/80* (2019.02); *B60S 5/06* (2013.01)

(58) Field of Classification Search
CPC .... B62D 21/15; B62D 21/157; B62D 21/152; B60K 2001/0438
USPC ........................ 180/68.5; 296/187.08, 187.12
See application file for complete search history.

(56) References Cited

U.S. PATENT DOCUMENTS

| | | | | |
|---|---|---|---|---|
| 5,833,023 A * | 11/1998 | Shimizu | ................ | B62D 21/00 180/68.5 |
| 5,984,403 A * | 11/1999 | Kuroda | ................ | B62D 21/152 280/784 |
| 6,416,094 B1 * | 7/2002 | Cherry | ................... | B60R 19/18 293/108 |
| 6,648,090 B2 * | 11/2003 | Iwase | ...................... | B60K 1/04 180/68.5 |
| 7,090,288 B2 * | 8/2006 | Suzuki | ................... | B60R 19/26 293/118 |
| 7,407,219 B2 * | 8/2008 | Glasgow | ................ | B60R 19/18 293/120 |
| 7,617,916 B2 * | 11/2009 | Heatherington | ..... | B21D 22/025 188/371 |
| 7,690,720 B2 * | 4/2010 | Wang | .................... | B62D 25/12 180/69.2 |
| 7,695,056 B2 * | 4/2010 | Hanson, Jr. | .......... | B62D 21/157 296/187.08 |

(Continued)

FOREIGN PATENT DOCUMENTS

| | | |
|---|---|---|
| CN | 105151194 A | 12/2015 |
| JP | 2017197047 A | 11/2017 |
| KR | 100257872 B1 | 6/2000 |

*Primary Examiner* — Jeffrey J Restifo
(74) *Attorney, Agent, or Firm* — David B. Kelley; Carlson, Gaskey & Olds

(57) ABSTRACT

This disclosure details mounting systems and associated methods for mounting a battery pack to an electrified vehicle. An exemplary electrified vehicle may include a frame, a battery pack, and a mounting system for mounting the battery pack to the frame. The mounting system may include one or more side rails. Each side rail may include a predefined crush initiator configured to plastically deform for absorbing and transferring energy during vehicle impact loading events.

18 Claims, 9 Drawing Sheets

(56) References Cited

U.S. PATENT DOCUMENTS

| | | | | |
|---|---|---|---|---|
| 7,802,839 B2* | 9/2010 | Ajisaka | ................... | B60K 1/04 |
| | | | | 296/187.09 |
| 7,997,368 B2 | 8/2011 | Takasaki et al. | | |
| 8,393,427 B2 | 3/2013 | Rawlinson | | |
| 8,608,230 B2* | 12/2013 | Young | ..................... | B60K 1/04 |
| | | | | 296/187.02 |
| 8,689,919 B2* | 4/2014 | Maeda | ................. | B62D 21/157 |
| | | | | 180/311 |
| 8,708,402 B2* | 4/2014 | Saeki | ....................... | B60K 1/04 |
| | | | | 180/68.5 |
| 8,833,839 B2* | 9/2014 | Young | ................. | B62D 21/157 |
| | | | | 296/187.12 |
| 8,893,866 B2* | 11/2014 | Lim | ........................ | B60R 19/34 |
| | | | | 188/377 |
| 8,967,312 B2 | 3/2015 | Yanagi | | |
| 9,139,074 B2 | 9/2015 | Jarocki | | |
| 9,205,872 B2* | 12/2015 | Okada | .................... | B62D 25/20 |
| 9,242,539 B2* | 1/2016 | Ling | ........................ | B60K 1/04 |
| 9,493,190 B1* | 11/2016 | Alwan | ................. | B62D 21/157 |
| 9,505,442 B2* | 11/2016 | Wu | ........................ | B62D 21/157 |
| 9,517,686 B1* | 12/2016 | Paramasivam | .......... | B60K 1/04 |
| 9,517,687 B2* | 12/2016 | Nakajima | ................ | B60K 1/04 |
| 9,561,824 B2* | 2/2017 | Tamaoki | .............. | B62D 21/152 |
| 9,623,742 B2* | 4/2017 | Ikeda | ....................... | B60K 1/04 |
| 9,758,029 B2* | 9/2017 | Hokazono | ................ | B60K 1/04 |
| 9,796,424 B2* | 10/2017 | Sakaguchi | ................ | B60K 1/04 |
| 9,809,100 B2* | 11/2017 | Kamimura | ......... | B62D 25/2036 |
| 9,809,101 B2* | 11/2017 | Ikeda | ................... | B62D 29/001 |
| 9,944,325 B2* | 4/2018 | Murray | ................ | B62D 21/157 |
| 9,956,859 B2* | 5/2018 | Ikeda | ....................... | B60K 1/04 |
| 9,987,913 B2* | 6/2018 | Hara | ....................... | B60K 1/04 |
| 9,994,257 B2* | 6/2018 | Maier | .................... | B62D 21/02 |
| 10,005,350 B1* | 6/2018 | Khan | ....................... | B60K 1/04 |
| 10,023,038 B2* | 7/2018 | Rawlinson | ............... | B60K 1/04 |
| 10,099,546 B2* | 10/2018 | Hara | ....................... | B60L 50/66 |
| 10,112,563 B2* | 10/2018 | Ashraf | .................... | B60R 19/34 |
| 10,207,574 B2* | 2/2019 | Ozawa | .................... | B60K 1/04 |
| 10,220,882 B2* | 3/2019 | Ayukawa | ............. | B62D 21/155 |
| 10,259,506 B2* | 4/2019 | Ayukawa | ........... | B62D 25/2036 |
| 10,266,210 B2* | 4/2019 | Maier | .................... | B60R 19/03 |
| 10,286,956 B2* | 5/2019 | Keuthage | ............. | B62D 25/025 |
| 10,293,860 B1* | 5/2019 | Cooper | ................ | B62D 21/157 |
| 10,293,861 B2* | 5/2019 | Jeong | ................ | B62D 25/2036 |
| 10,322,757 B2* | 6/2019 | Shimoda | ................ | B62D 25/20 |
| 2013/0252059 A1 | 9/2013 | Choi et al. | | |
| 2015/0176673 A1* | 6/2015 | Kaneko | ................ | B62D 21/157 |
| | | | | 188/377 |
| 2016/0233468 A1 | 8/2016 | Nusier et al. | | |
| 2016/0311301 A1* | 10/2016 | Ikeda | ................... | B62D 29/001 |

\* cited by examiner

HIGH VOLTAGE BATTERY PACK MOUNTING SYSTEMS FOR PROVIDING LOAD PATH MANAGEMENT DURING IMPACT LOADING EVENTS

TECHNICAL FIELD

This disclosure relates generally to electrified vehicle battery packs, and more particularly to battery pack mounting systems for effectively managing load paths during impact loading events.

BACKGROUND

The desire to reduce automotive fuel consumption and emissions has been well documented. Therefore, electrified vehicles are being developed that reduce or completely eliminate reliance on internal combustion engines. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack may be susceptible to various vehicle loads, including loads that are imparted during vehicle impact loading events (e.g., front, side, side pole, rear, etc.) during operation of the electrified vehicle.

SUMMARY

An electrified vehicle according to an exemplary aspect of the present disclosure includes, among other things, a frame, a battery pack, and a mounting system for mounting the battery pack to the frame. The mounting system includes a side rail that includes a predefined crush initiator configured to plastically deform, thereby minimizing the transfer of impact loads into the battery pack.

In a further non-limiting embodiment of the foregoing electrified vehicle, the frame includes a first rail, a second rail, and a cross member extending between the first rail and the second rail. The battery pack is at least partially between the first rail and the second rail.

In a further non-limiting embodiment of either of the foregoing electrified vehicles, a first plurality of fasteners are included for mounting the side rail to the frame, and a second plurality of fasteners are included for mounting the battery pack to the side rail.

In a further non-limiting embodiment of any of the foregoing electrified vehicles, the side rail includes a first mount section mounted to the battery pack, a second mount section mounted to the frame, and a plurality of wall sections extending between the first mount section and the second mount section.

In a further non-limiting embodiment of any of the foregoing electrified vehicles, the plurality of wall sections includes two wall sections.

In a further non-limiting embodiment of any of the foregoing electrified vehicles, the plurality of wall sections includes three wall sections.

In a further non-limiting embodiment of any of the foregoing electrified vehicles, the plurality of wall sections includes four wall sections.

In a further non-limiting embodiment of any of the foregoing electrified vehicles, each of the plurality of wall sections includes at least one predefined crush initiator.

In a further non-limiting embodiment of any of the foregoing electrified vehicles, each of the plurality of wall sections includes at least two predefined crush initiators.

In a further non-limiting embodiment of any of the foregoing electrified vehicles, the mounting system includes a second side rail mounted to an opposite side of the battery pack from the side rail, and the second side rail includes a second predefined crush initiator.

In a further non-limiting embodiment of any of the foregoing electrified vehicles, the predefined crush initiator includes a notch formed in a wall section of the side rail.

In a further non-limiting embodiment of any of the foregoing electrified vehicles, the predefined crush initiator includes an area of reduced thickness formed in a wall section of the side rail.

In a further non-limiting embodiment of any of the foregoing electrified vehicles, the predefined crush initiator includes a perforation formed in a wall section of the side rail.

In a further non-limiting embodiment of any of the foregoing electrified vehicles, the predefined crush initiator extends across an entire length of a wall section of the side rail.

In a further non-limiting embodiment of any of the foregoing electrified vehicles, a rail reinforcement is secured within a pocket of the side rail or secured to an exterior surface of the side rail.

A method according to another exemplary aspect of the present disclosure includes, among other things, mounting a battery pack to a frame of an electrified vehicle with a mounting system that includes a side rail having at least one predefined crush initiator, and plastically deforming the at least one predefined crush initiator in response to a vehicle impact loading event, thereby minimizing the transfer of impact loads into the battery pack.

In a further non-limiting embodiment of the foregoing method, mounting the battery pack includes mounting the battery pack to the side rail using a first fastener and mounting the side rail to the frame using a second fastener.

In a further non-limiting embodiment of either of the foregoing methods, plastically deforming the at least one predefined crush initiator includes buckling or shearing the side rail along the at least one predefined crush initiator.

In a further non-limiting embodiment of any of the foregoing methods, the at least one crush initiator is established by a notch formed in the side rail, an area of reduced thickness of the side rail, or a perforation formed in the side rail.

In a further non-limiting embodiment of any of the foregoing methods, the method includes stiffening a discrete portion of the side rail with a rail reinforcement.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details mounting systems and associated methods for mounting a battery pack to an electrified vehicle. An exemplary electrified vehicle may include a frame, a battery pack, and a mounting system for mounting the battery pack to the frame. The mounting system may include one or more side rails. Each side rail may include a predefined crush initiator configured to plastically deform for absorbing and transferring energy during vehicle impact loading events. These and other features are discussed in greater detail in the following paragraphs of this detailed description.

Figure 1:
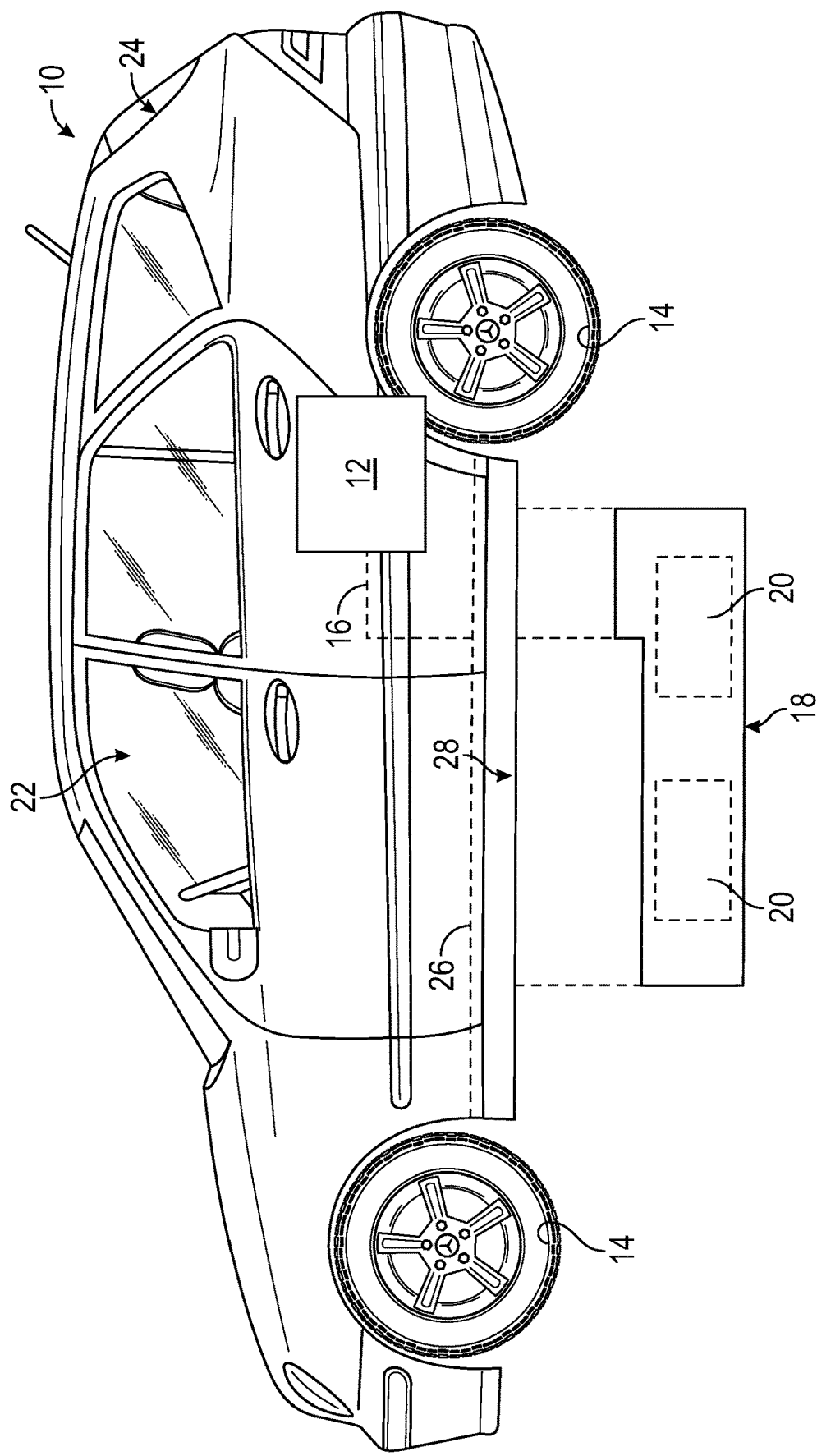
FIG. 1 schematically illustrates an electrified vehicle.
Figure 2:
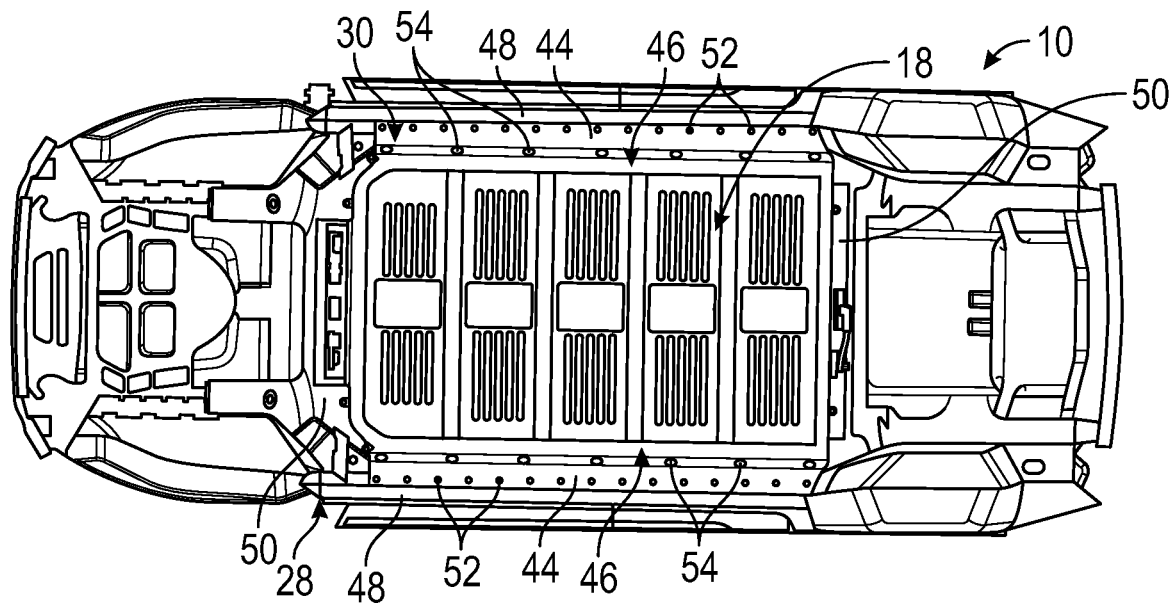
FIG. 2 illustrates an underside of the electrified vehicle of FIG. 1.

FIGS. 1 and 2 schematically illustrates an electrified vehicle 10. The electrified vehicle 10 could be a car, a truck, a van, a sport utility vehicle, a crossover, or any other type of vehicle that includes an electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEVs), fuel cell vehicles, etc. Therefore, although not specifically shown in this embodiment, the electrified vehicle 10 could be equipped with an internal combustion engine that can be employed either alone or in combination with other energy sources to propel the electrified vehicle 10.

Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to show certain details of a particular component.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A voltage bus 16 electrically connects the electric machine 12 to a battery pack 18. The battery pack 18 is an exemplary electrified vehicle battery. The battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The battery pack 18 may be mounted at various locations of the electrified vehicle 10. In an embodiment, the electrified vehicle 10 includes a passenger cabin 22 and a cargo space 24 (e.g., a trunk) located to the rear of the passenger cabin 22. A floor pan 26 may separate the passenger cabin 22 from a vehicle frame 28, which generally establishes the vehicle underbody. The battery pack 18 may be suspended from or otherwise mounted to the vehicle frame 28 such that it is remote from both the passenger cabin 22 and the cargo space 24. The battery pack 18 therefore does not occupy space that would otherwise be available for carrying passengers or cargo.

Due at least in part to its underbody mounting location, the battery pack 18 may be susceptible to various vehicle loads including, but not limited to, impact loads (e.g., loads imparted during collisions and running clearance events, for example), durability loads, and inertial loads. If not isolated, these impact loads could be transferred directly into the battery pack 18, which could, in turn, generate large forces that can be damaging to the relatively sensitive internal components of the battery pack 18.

Novel mounting systems 30 for mounting the battery pack 18 to the vehicle frame 28 of the electrified vehicle 10 are therefore proposed in this disclosure. As discussed in greater detail below, the mounting systems 30 are capable of absorbing and distributing impact loads that may be imparted during vehicle impact loading events (e.g., front, side, side pole, rear, etc.), thereby substantially minimizing the transfer of impact loads into the battery pack 18.

Figure 3:
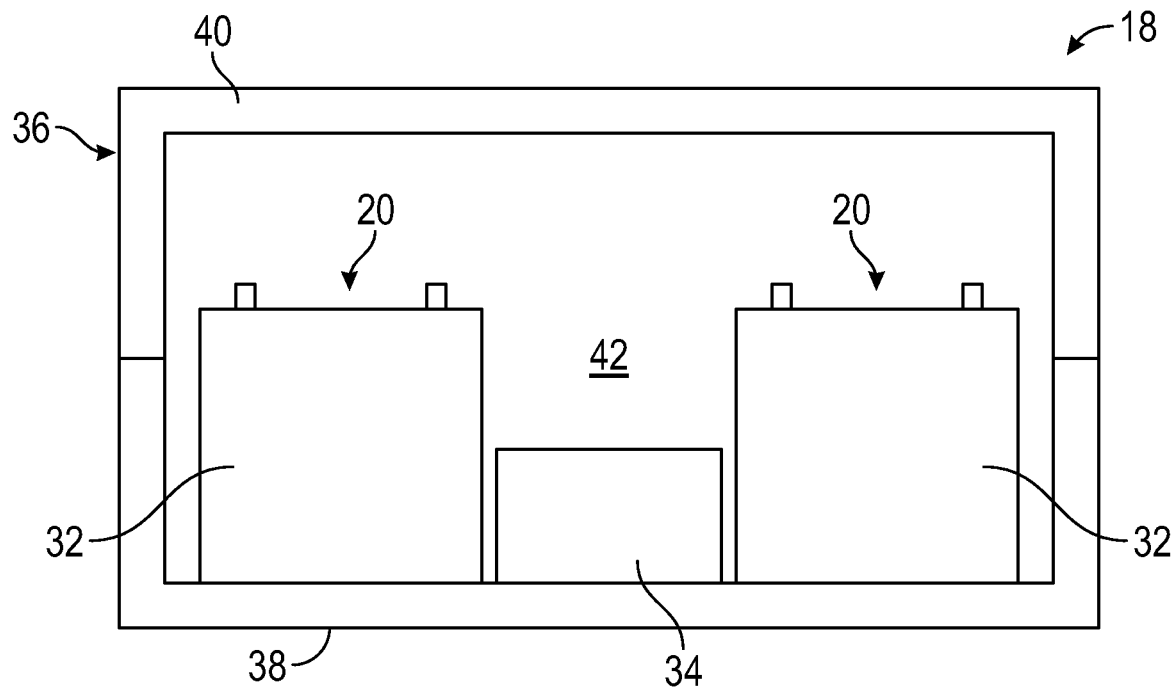
FIG. 3 illustrates an exemplary battery pack of an electrified vehicle.

FIG. 3 is a cross-sectional view of the battery pack 18 of FIG. 1. The battery pack 18 may house a plurality of battery cells 32 that store energy for powering various electrical loads of the electrified vehicle 10, such as the electric machine 12 of FIG. 1, for example. In an embodiment, the battery pack 18 houses prismatic, lithium-ion battery cells. However, battery cells having other geometries (cylindrical, pouch, etc.), other chemistries (nickel-metal hydride, lead-acid, etc.), or both could alternatively be utilized within the scope of this disclosure.

The battery pack 18 may additionally house one or more battery electronic components 34. The battery electronic component 34 could include a bussed electrical center (BEC), a battery electric control module (BECM), wiring harnesses, wiring loops, I/O connectors etc., or any combination of these battery electronic components.

The battery cells 32 may be grouped together in one or more battery arrays 20. In an embodiment, the battery pack 18 includes two battery arrays 20. However, the total numbers of battery cells 32 and battery arrays 20 employed within the battery pack 18 are not intended to limit this disclosure.

An enclosure assembly 36 may house each battery array 20 and battery electronic component 34 of the battery pack 18. Since the battery arrays 20 and the battery electronic components 34 are housed inside the enclosure assembly 36, these components are considered battery internal components of the battery pack 18. The battery internal components are examples of the types of sensitive components that could become damaged if impact loads are transferred into the battery pack 18 during vehicle impact loading events.

Although an example placement of the battery array 20 and the battery electronic components 34 is shown in FIG. 3, this particular placement is not intended to limit this disclosure. The battery internal components of the battery pack 18 can be arranged in any configuration inside the enclosure assembly 36.

In an embodiment, the enclosure assembly 36 is a sealed enclosure. The enclosure assembly 36 may include any size, shape, and configuration within the scope of this disclosure.

The enclosure assembly 36 may include a tray 38 and a cover 40. The tray 38 and the cover 40 cooperate to surround and enclose the battery arrays 20 and the battery electronic components 34. The tray 38 may provide an open area 42 for holding the battery arrays 20 and the battery electronic components 34. After positioning the battery arrays 20 and the battery electronic components 34 within the open area 42, the cover 40 may be seated and sealed to the tray 38 to enclose the battery arrays 20 and the battery electronic components 34.

In an embodiment, the enclosure assembly 36 is a metallic-based component. For example, the tray 38 and the cover 40 could be constructed out of aluminum or steel. However, other materials, including polymer-based materials, may also be suitable for constructing the components of the enclosure assembly 36.

Figure 4:
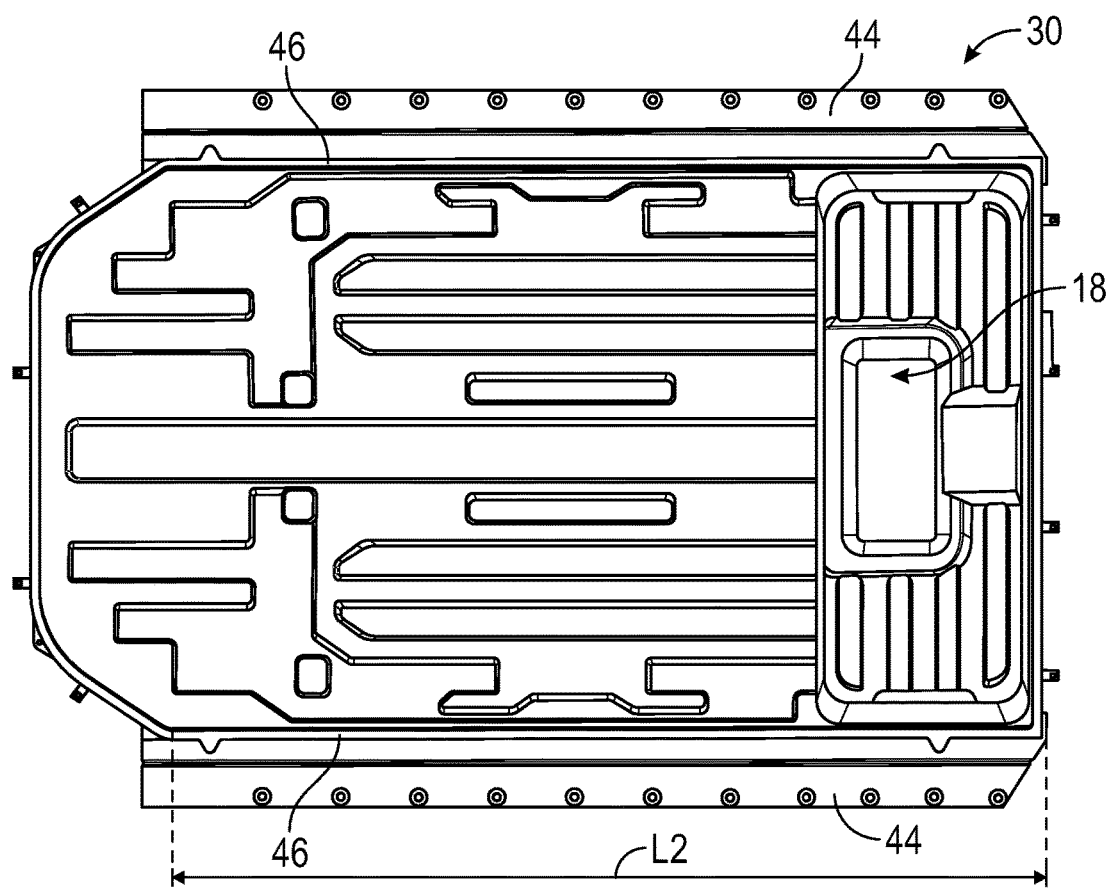
FIG. 4 illustrates a battery pack mounting system for mounting a battery pack to an electrified vehicle.

FIGS. 2 and 4 illustrate the exemplary mounting system 30 for mounting the battery pack 18 to the vehicle frame 28. The mounting system 30 may include one or more side rails 44 for both connecting the battery pack 18 to the vehicle frame 28 and absorbing and transferring impact loads that may be imparted onto the vehicle frame 28 during operation of the electrified vehicle 10. In an embodiment, the mounting system 30 includes two side rails 44, with one said rail 44 being mounted to each opposing side 46 of the battery pack 18. However, other configurations are also contemplated, and thus the total number and mounting locations of the side rails 44 are not intended to limit this disclosure.

The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle are integrated into one another, or may be part of a body-on-frame construction. The vehicle frame 28 may be made of a metallic material, such as steel, carbon steel, or an aluminum alloy, as non-limiting examples.

The vehicle frame 28 includes a plurality of rails 48 (sometimes referred to as "frame rails" or "beams"). FIG. 2 shows two such rails 48. The rails 48 are spaced apart from one another and extend longitudinally to establish a length of the vehicle frame 28. A plurality of cross members 50 may extend between the rails 48 of the vehicle frame 28. The cross members 50 may generally extend transversely relative to the rails 48 for establishing a width of the vehicle frame 28.

The side rails 44 may be mounted to the rails 48, the cross members 50, or both. In the illustrated embodiment of FIG. 2, one of the side rails 44 is mounted to each of the rails 48. In a mounted position of the battery pack 18, the side rails 44 may be positioned axially between the rails 48 and the sides 46 of the battery pack 18.

A plurality of fasteners 52 of the mounting system 30 may be used to fixedly mount the side rails 44 to the rails 48 of the vehicle frame 28. A second plurality of fasteners 54 of the mounting system 30 may be used to fixedly mount the battery pack 18 to the side rails 44. The fasteners 52, 54 may be relatively rigid bolts or screws. Other types of fasteners could also be used within the scope of this disclosure. The total number of fasteners 52, 54 employed by the mounting system 30 may vary per design and is therefore not intended to limit this disclosure.

Figure 5:
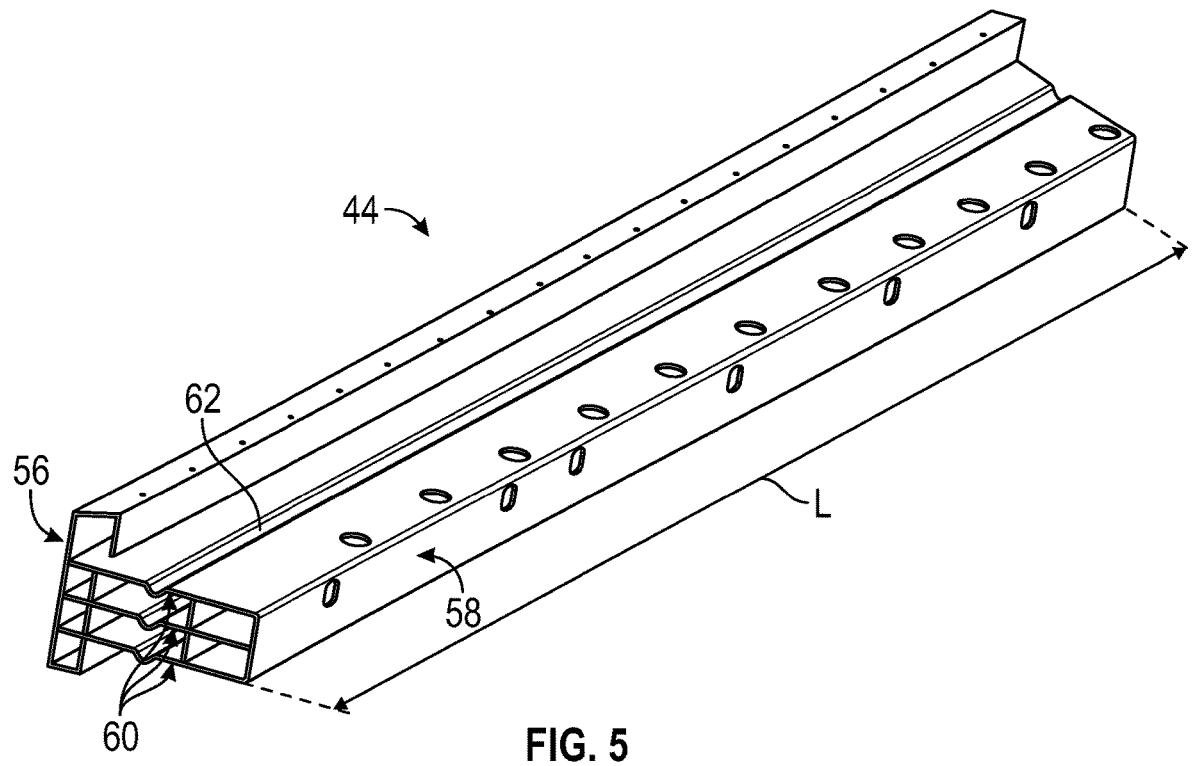
FIG. 5 is a perspective view of an exemplary side rail of a battery pack mounting system.
Figure 6:
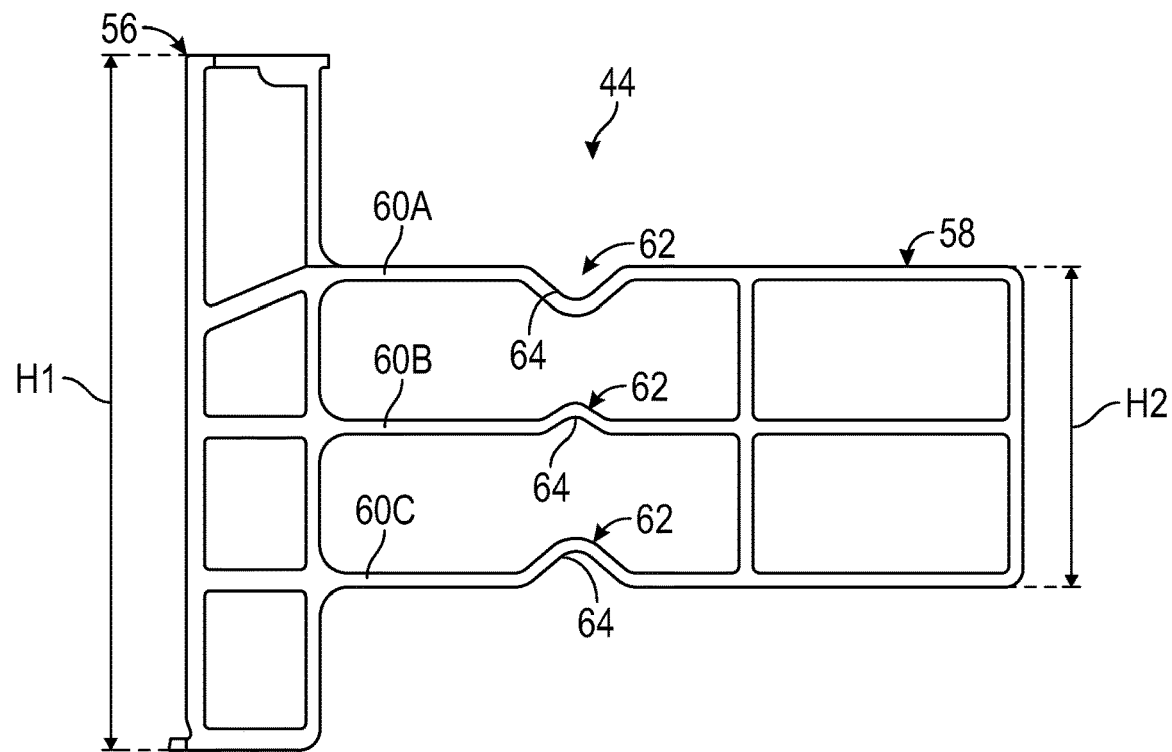
FIG. 6 is an end view of the side rail of FIG. 5.

FIGS. 5-6 illustrate an exemplary side rail 44 of the mounting system 30. In an embodiment, the side rail 44 is an extruded metallic component. For example, the side rail 44 could be constructed from aluminum or steel. Other materials and manufacturing techniques could alternatively or additionally be used to manufacture the side rail 44 within the scope of this disclosure.

The side rail 44 may extend along a length L. The actual dimension of the length L could vary per vehicle design. In an embodiment, the length L is substantially the same (e.g., within 10%) as a length L2 of the side 46 of the battery pack 18 (see, e.g., FIG. 4).

Figure 17:
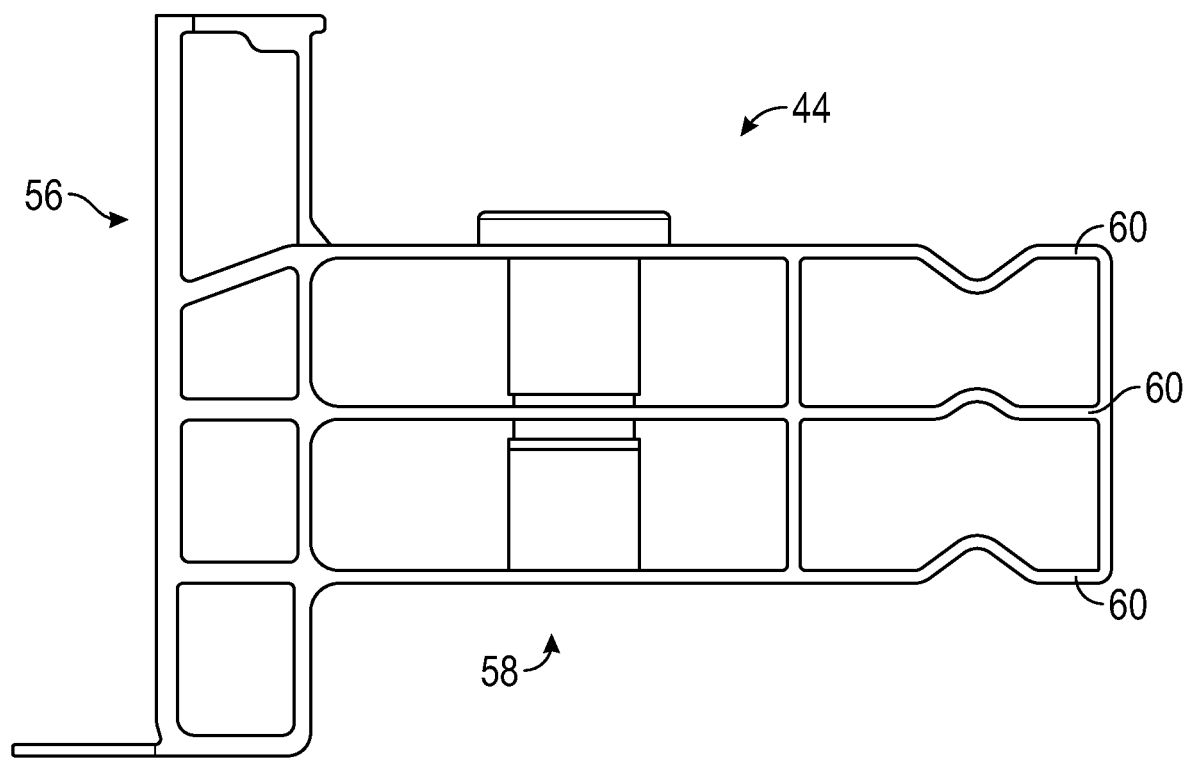
FIG. 17 illustrates yet another exemplary side rail of a battery pack mounting system.

The side rail 44 may include a first or battery-side mount section 56, a second or frame-side mount section 58, and a plurality of wall sections 60 that extend laterally between the battery-side mount section 56 and the frame-side mount section 60. In other embodiments, the plurality of wall sections 60 may be disposed laterally adjacent to the battery-side mount section 56 and the frame-side mount section 58, which can be side by side to one another (see, e.g., FIG. 17). The battery-side mount section 56 is the portion of the side rail 44 that can be mounted to the battery pack 18, and the frame-side mount section 58 is the portion of the side rail 44 that can be mounted to the rail 48 of the frame 28. In an embodiment, the battery-side mount section 56 includes a first height H1 that is larger than a second height H2 of the frame-side mount section 58 (see FIG. 6).

Figure 7:
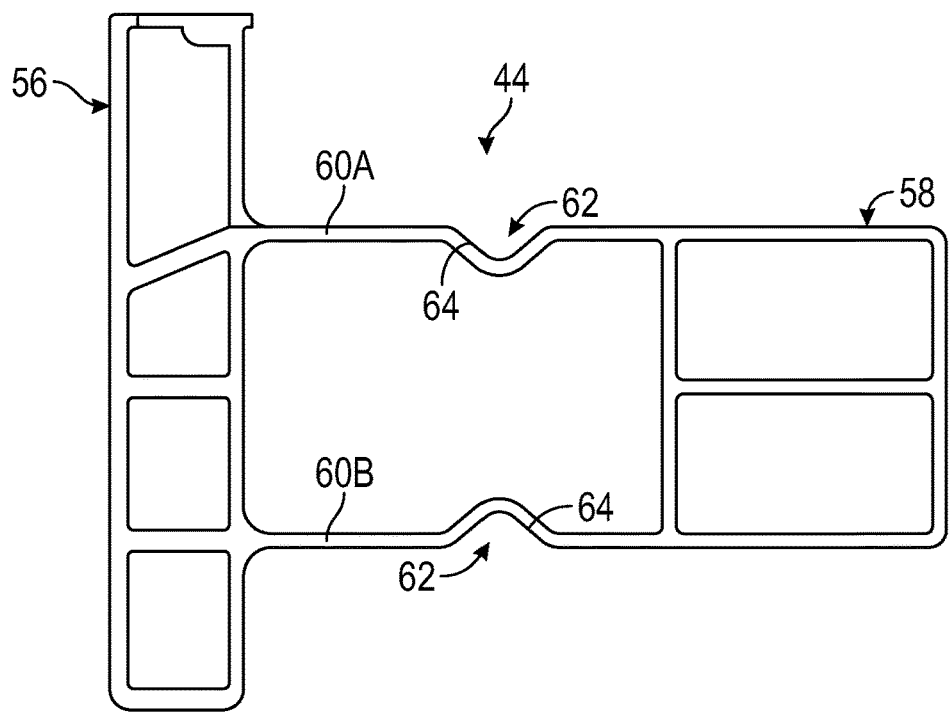
FIG. 7 illustrates another exemplary side rail of a battery pack mounting system.
Figure 8:
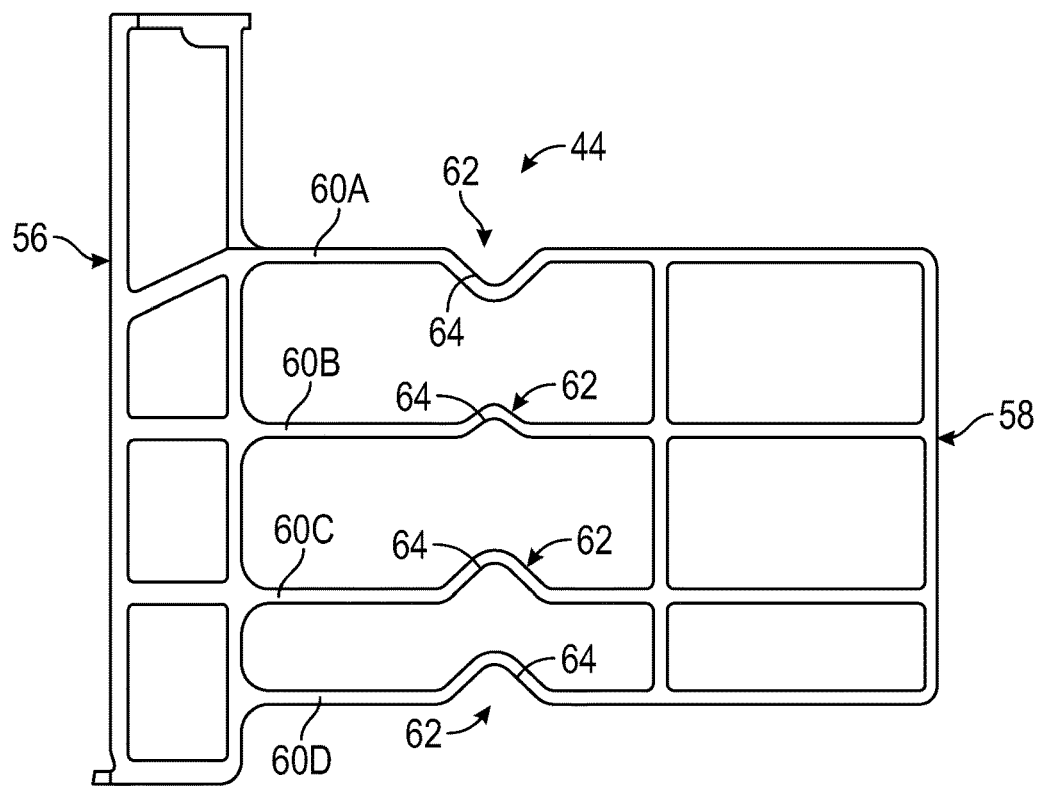
FIG. 8 illustrates yet another exemplary side rail of a battery pack mounting system.

The side rail 44 may include two or more wall sections 60. In an embodiment, the side rail 44 includes three wall sections 60A, 60B, and 60C (see FIG. 6). In another embodiment, the side rail 44 includes two wall sections 60A, 60B (see FIG. 7). In yet another embodiment, the side rail 44 includes four wall sections 60A, 60B, 60C, and 60D (see FIG. 8). The total number of wall sections 60 provided on the side rail 44 is design dependent and may depend on the weight of the battery pack 18, among various other design criteria.

Figure 9:
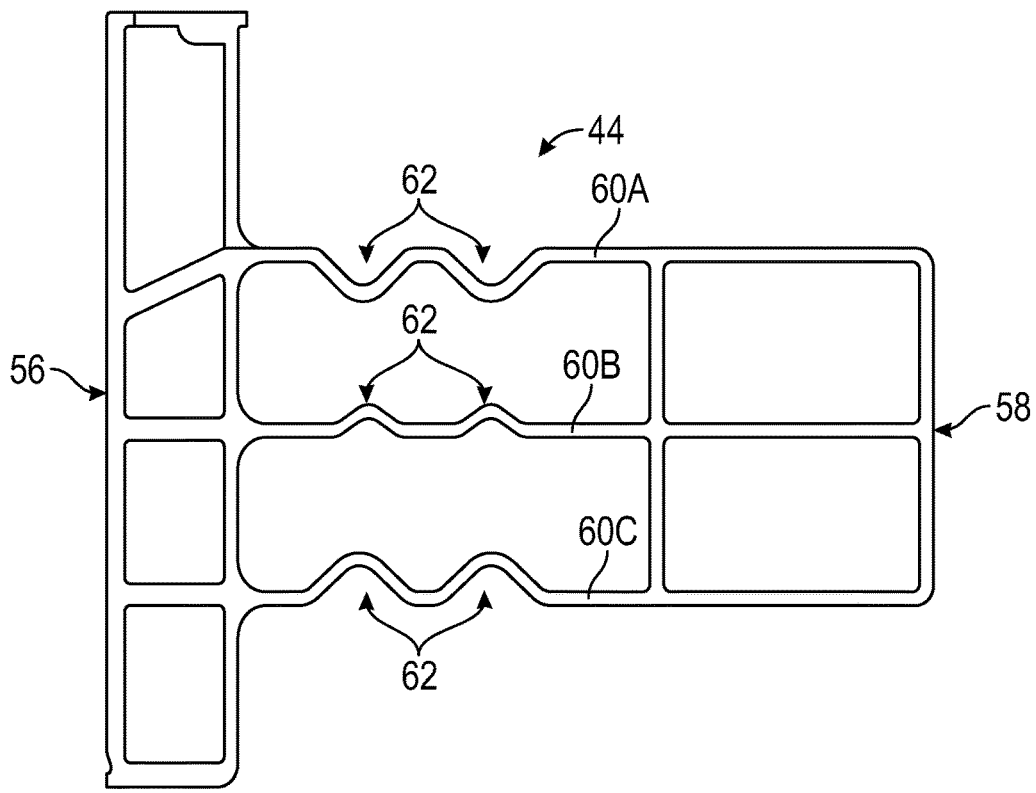
FIG. 9 illustrates yet another exemplary side rail of a battery pack mounting system.

Each wall section 60 of the side rail 44 may include one or more predefined crush initiators 62. In the illustrated embodiment of FIG. 6, the wall sections 60A, 60B, 60C each include a single predefined crush initiator 62. In another embodiment, the wall sections 60A, 60B, 60C each include multiple (e.g., two or more) predefined crush initiators 62 (see FIG. 9). The total number of predefined crush initiators 62 provided on each side rail 44 could vary per vehicle design.

In an embodiment, each predefined crush initiator 62 extends across an entire length L of the side rail 44 (see, e.g., FIG. 5). However, in alternative embodiments, one or more of the predefined crush initiators 62 could be designed to extend across only discrete portions of the length L.

Each predefined crush initiator 62 may be formed in the wall sections 60 by scoring, cutting, or otherwise forming a shallow notch 64 into a surface of the wall section 60. The notch 64 creates a weakened area in the wall section 60. The wall section 60 can plastically deform, such as by buckling or shearing, at the predefined crush initiator 62 if a force from a vehicle impact loading event exceeds a pre-defined load threshold of the predefined crush initiator 62. The pre-defined load threshold could be a tension, compression, shear, buckling, or bending load threshold, for example. By plastically deforming at the predefined crush initiator 62, energy is absorbed and transferred along the length L of the side rail 44, thereby minimizing the intrusion of impact loads into the battery pack 18 where the sensitive battery internal components reside.

The predefined crush initiator 62 of some of the wall sections 60 of the side rail 44 may be inverted relative to the predefined crush initiators 62 of other wall sections 60 of the side rail 44. Providing such an inverted relationship between neighboring predefined crush initiators 62 may substantially reduce the likelihood of the side rail 44 rotating during a vehicle impact loading event. In the embodiment of FIG. 6, for example, the predefined crush initiators 62 of the wall sections 60B and 60C are inverted relative to the predefined crush initiator 62 of the wall section 60A. This may be accomplished, in an embodiment, by arranging the predefined crush initiator 62 of the wall section 60A to include a concave configuration and arranging the predefined crush initiators 62 of the wall sections 60B and 60C to include a convex configuration. Of course, other arrangements of the predefined crush initiators 62 are also contemplated within the scope of this disclosure.

Figure 10:
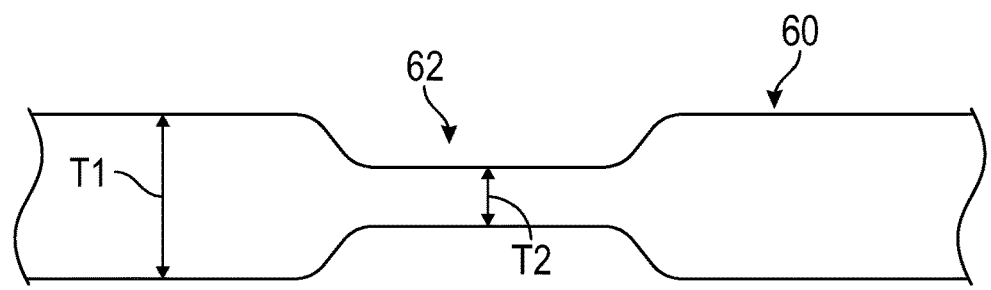
FIG. 10 illustrates a predefined crush initiator of a side rail of a battery pack mounting system.

The predefined crush initiator 62 may be established by features other than or in addition to the notch 64 shown in FIGS. 6-9. For example, as shown in FIG. 10, the wall section 60 may include an area having a thickness T1 and another area having a reduced thickness T2. The area of the reduced thickness T2 establishes the predefined crush initiator 62 of the wall section 60.

Figure 11:
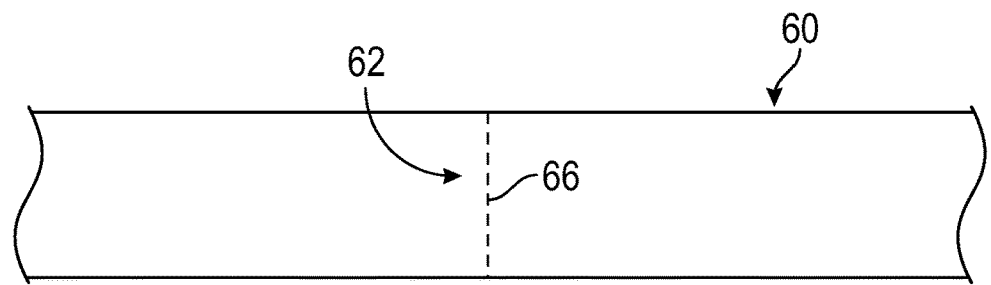
FIG. 11 illustrates another predefined crush initiator of a side rail of a battery pack mounting system.

In yet another embodiment, shown in FIG. 11, the predefined crush initiator 62 may be formed by creating a perforation 66 in the wall section 60. The perforation 66 creates a weakened area in the wall section 60 at which the wall section 60 can plastically deform if an impact load exceeds the pre-defined load threshold of the predefined crush initiator 62.

Figure 12:
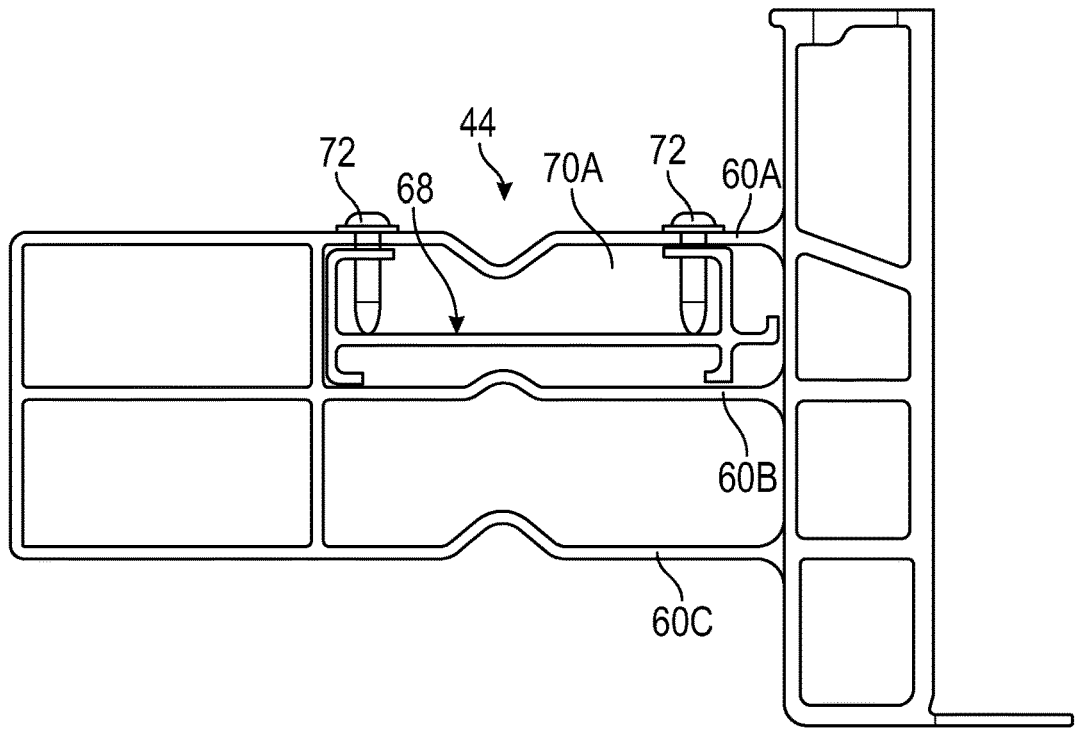
FIG. 12 illustrates an exemplary reinforcing configuration for use with a side rail of a battery pack mounting system.
Figure 13:
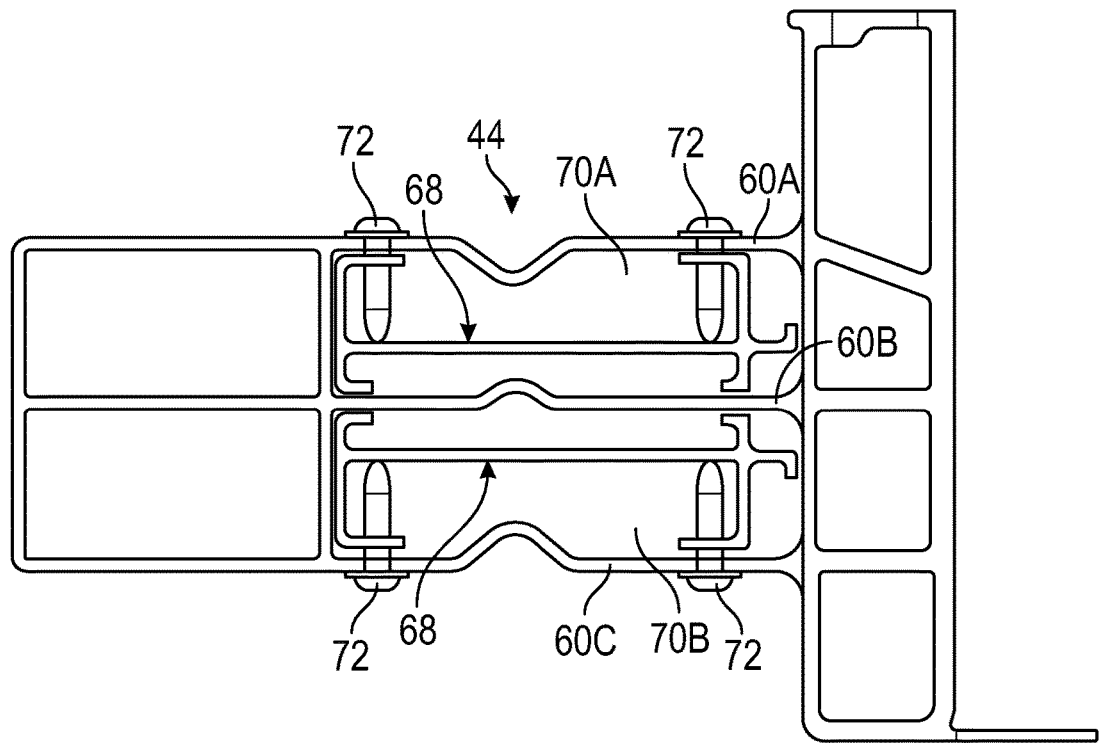
FIG. 13 illustrates another exemplary reinforcing configuration for use with a side rail of a battery pack mounting system.

Portions of the side rail 44 may be reinforced for situations in which plastic deformation is not favorable during vehicle impact loading events. FIG. 12 illustrates a rail reinforcement 68 that may be secured to the side rail 44 for stiffening a discrete portion of the length L of the side rail 44, thereby substantially preventing crush initiation along the discrete portion. In an embodiment, the rail reinforcement 68 may be positioned within a pocket 70A that extends between the wall section 60A and the wall section 60B of the side rail 44. The rail reinforcement 68 may be mounted to the wall section 60A using fasteners 72. In another embodiment, an additional rail reinforcement 68 may be positioned within a pocket 70B that extends between the wall section 60B and the wall section 60C (see FIG. 13). The additional rail reinforcement 68 may be mounted to the wall section 60C using additional fasteners 72. Any number of rail reinforcements 68 could be positioned within the side rail 44 for stiffening discrete sections of the side rail 44.

Figure 14:
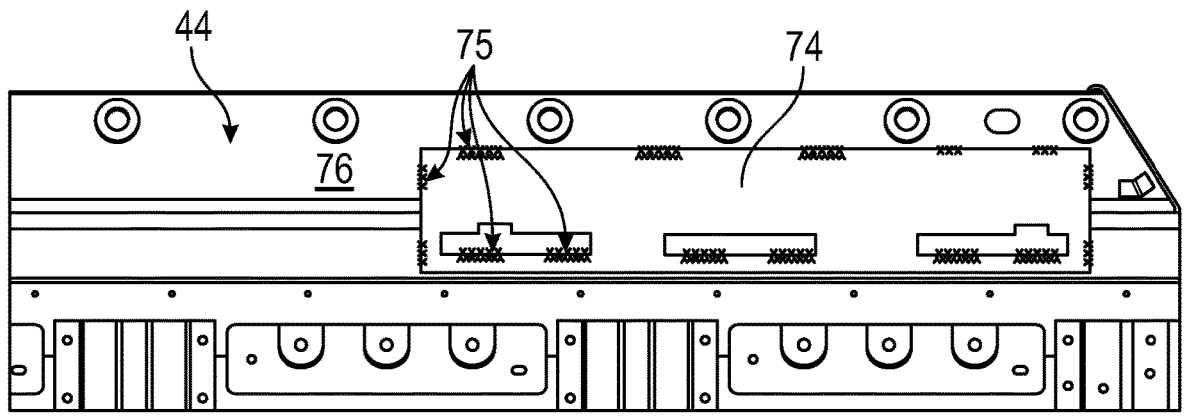
FIG. 14 illustrates yet another exemplary reinforcing configuration for use with a side rail of a battery pack mounting system.

FIG. 14 illustrates another rail reinforcement 74 that could be employed to stiffen the side rail 44 at discrete locations thereof. In an embodiment, the rail reinforcement 74 is mounted (e.g., welded via weld beads 75) to an exterior surface 76 of one or more of the wall sections 60. Any number of rail reinforcements 74 could be mounted to exterior of the side rail 44 for stiffening discrete sections of the side rail 44.

Figure 15:
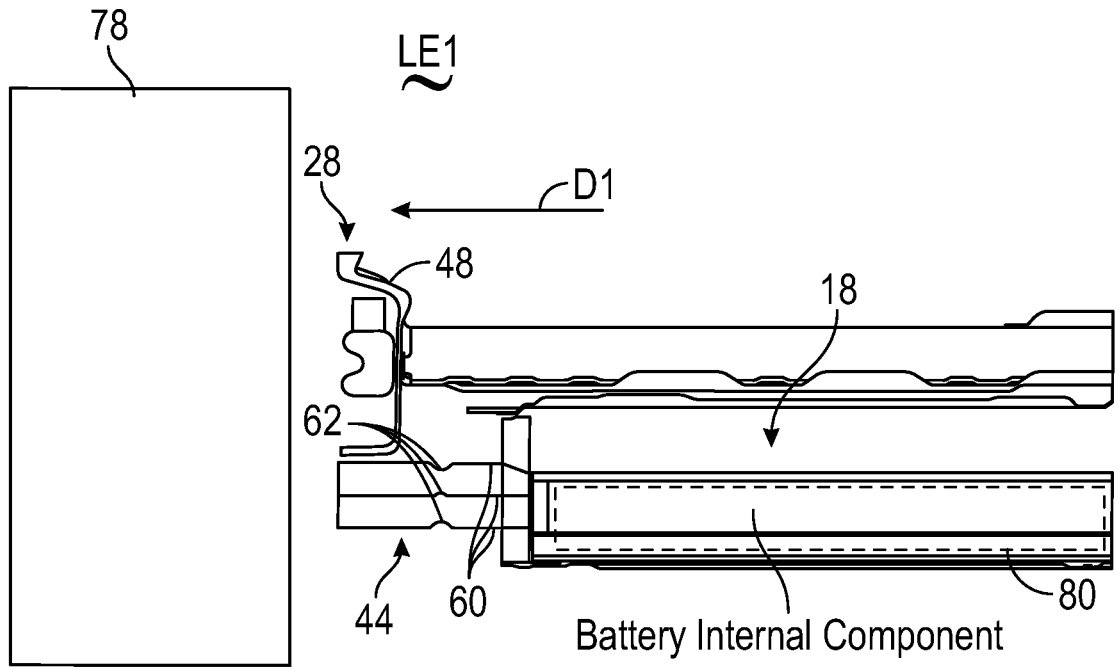
FIG. 15 schematically illustrates the behavior of a battery pack mounting system during a first vehicle impact loading event.

FIG. 15 schematically illustrates the behavior of the side rail 44 of FIGS. 5 and 6 during a first vehicle impact loading event LE1. In an embodiment, the first vehicle impact loading event LE1 is a side pole impact event in which the electrified vehicle 10 moves in a direction D1 into a stationary object or pole 78. As the electrified vehicle 10 moves into the pole 78, the wall sections 60 of the side rail 44 may plastically deform at the predefined crush initiators 62 in order to minimize the transfer of impact loads into the battery pack 18, thereby protecting the battery internal components 80 from being damaged.

Figure 16:
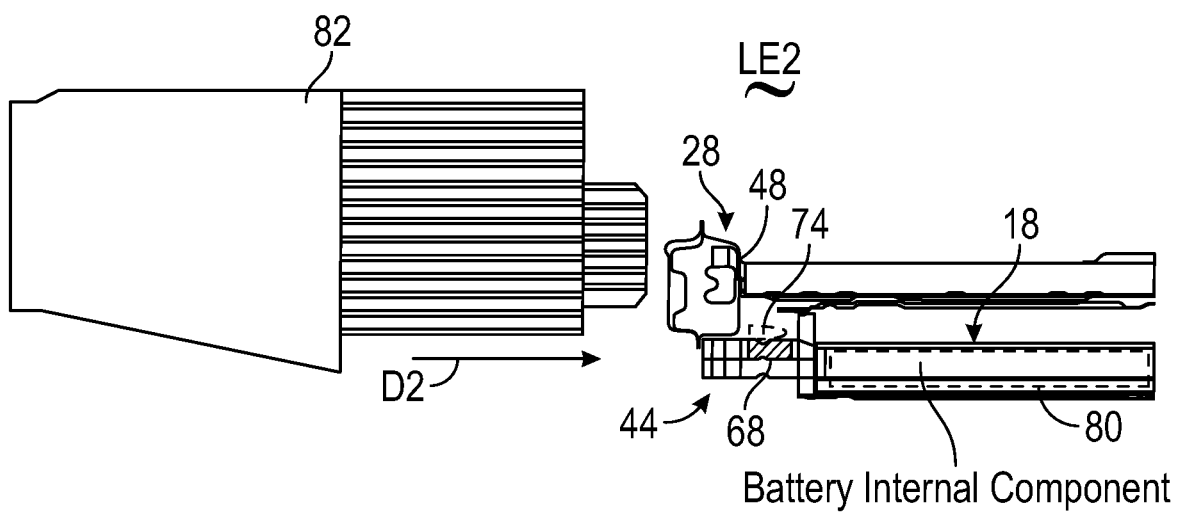
FIG. 16 schematically illustrates the behavior of a battery pack mounting system during a second vehicle impact loading event.

FIG. 16 schematically illustrates the behavior of the side rail 44 of FIG. 12 during a second vehicle impact loading event LE2. In an embodiment, the second vehicle impact loading event LE2 is a side impact loading event in which a moving barrier 82 moves in a direction D2 into a side of the electrified vehicle 10. As the moving barrier 82 intrudes into the electrified vehicle 10, the rail reinforcement 68 (or rail reinforcement 74) helps stop the intrusion of the moving barrier 82 from interacting with the battery internal components 80.

The exemplary battery pack mounting systems of this disclosure provide efficient strategies for load path management of battery structures during vehicle impact loading events. The mounting systems incorporate side rails having predefined crush initiators that are designed to plastically deform during impact events, thereby minimizing the transfer of impact loads into the battery pack. The use of the exemplary side rails of this disclosure may further provide a low cost solution for commonizing the battery pack design across multiple vehicle platforms.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrified vehicle, comprising:
a frame;
a battery pack; and
a mounting system for mounting the battery pack to the frame,
wherein the mounting system includes a side rail that includes a predefined crush initiator configured to plastically deform, thereby minimizing the transfer of impact loads into the battery pack,
wherein the side rail is mounted to both the frame and the battery pack,
wherein the side rail includes a first mount section mounted to the battery pack, a second mount section mounted to the frame, and a plurality of wall sections extending between the first mount section and the second mount section,
wherein each of the plurality of wall sections extends in a direction that is parallel to a longitudinal axis of the battery pack.

2. The electrified vehicle as recited in claim 1, wherein the frame includes a first rail, a second rail, and a cross member extending between the first rail and the second rail, and the battery pack is at least partially between the first rail and the second rail.

3. The electrified vehicle as recited in claim 1, comprising a first plurality of fasteners for mounting the side rail to the frame, and a second plurality of fasteners for mounting the battery pack to the side rail.

4. The electrified vehicle as recited in claim 1, wherein the plurality of wall sections includes two wall sections.

5. The electrified vehicle as recited in claim 1, wherein the plurality of wall sections includes three wall sections.

6. The electrified vehicle as recited in claim 1, wherein the plurality of wall sections includes four wall sections.

7. The electrified vehicle as recited in claim 1, wherein each of the plurality of wall sections includes at least one predefined crush initiator.

8. The electrified vehicle as recited in claim 1, wherein each of the plurality of wall sections includes at least two predefined crush initiators.

9. The electrified vehicle as recited in claim 1, wherein the mounting system includes a second side rail mounted to an opposite side of the battery pack from the side rail, wherein the second side rail includes a second predefined crush initiator.

10. The electrified vehicle as recited in claim 1, wherein the predefined crush initiator includes a notch formed in a wall section of the side rail.

11. The electrified vehicle as recited in claim 1, wherein the predefined crush initiator includes an area of reduced thickness formed in a wall section of the side rail.

12. The electrified vehicle as recited in claim 1, wherein the predefined crush initiator includes a perforation formed in a wall section of the side rail.

13. The electrified vehicle as recited in claim 1, wherein the predefined crush initiator extends across an entire length of a wall section of the side rail.

14. The electrified vehicle as recited in claim 1, comprising a rail reinforcement secured within a pocket of the side rail or secured to an exterior surface of the side rail.

15. The electrified vehicle as recited in claim 1, wherein the side rail includes a first length that is substantially equal to a second length of a side of the battery pack.

16. An electrified vehicle, comprising:
a frame;
a battery pack; and
a mounting system for mounting the battery pack to the frame,
wherein the mounting system includes a side rail that includes a predefined crush initiator configured to plastically deform, thereby minimizing the transfer of impact loads into the battery pack,
wherein the side rail is mounted to both the frame and the battery pack,
wherein the side rail includes a first mount section mounted to the battery pack, a second mount section mounted to the frame, and a plurality of wall sections extending between the first mount section and the second mount section,
wherein first mount section includes a first height that is larger than a second height of the second mount section.

17. An electrified vehicle, comprising:
a frame;
a battery pack; and
a mounting system for mounting the battery pack to the frame,
wherein the mounting system includes a side rail that includes a predefined crush initiator configured to plastically deform, thereby minimizing the transfer of impact loads into the battery pack,
wherein the side rail is mounted to both the frame and the battery pack,
wherein the side rail includes a first mount section mounted to the battery pack, a second mount section mounted to the frame, and a plurality of wall sections extending between the first mount section and the second mount section
wherein a first wall section of the plurality of wall sections includes a first predefined crush initiator and a second wall section of the plurality of wall sections includes a second predefined crush initiator, and the second predefined crush initiator is inverted relative to the first predefined crush initiator.

18. An electrified vehicle, comprising:
a frame;
a battery pack;
a mounting system that includes a side rail for mounting the battery pack to the frame,
wherein the side rail includes a battery-side mount section mounted directly to the battery pack, a frame-side mount section mounted directly to the frame, and at least two wall sections extending from the battery-side mount section to the frame-side mount section,
wherein each of the at least two wall sections includes a predefined crush initiator configured to plastically deform, thereby minimizing the transfer of impact loads into the battery pack,
wherein the predefined crush initiator includes a notch, a perforation, or an area of reduced thickness;
a first plurality of fasteners for mounting the battery-side mount section to the battery pack;
a second plurality of fasteners for mounting the frame-side mount section to the frame; and
a rail reinforcement secured within a pocket of the side rail or secured to an exterior surface of the side rail,
wherein the rail reinforcement is configured to stiffen a portion of the side rail.

* * * * *